No. 865,440. PATENTED SEPT. 10, 1907.
C. W. SLEEPER.
FLANGING MACHINE.
APPLICATION FILED NOV. 30, 1906.

6 SHEETS—SHEET 1.

WITNESSES.
R. N. Flint
A. M. Perkins

INVENTOR.
CHARLES W. SLEEPER
by A. P. Greeley
Atty.

THE NORRIS PETERS CO., WASHINGTON, D. C.

No. 865,440. PATENTED SEPT. 10, 1907.
C. W. SLEEPER.
FLANGING MACHINE.
APPLICATION FILED NOV. 30, 1906.

6 SHEETS—SHEET 4.

WITNESSES.
R. N. Flint
A. M. Parkus

INVENTOR.
CHARLES W. SLEEPER
by
Att'y

No. 865,440. PATENTED SEPT. 10, 1907.
C. W. SLEEPER.
FLANGING MACHINE.
APPLICATION FILED NOV. 30, 1906.

6 SHEETS—SHEET 5.

Witnesses.
R. N. Flint
A. M. Parkhurst

Inventor,
CHARLES W. SLEEPER

Atty.

No. 865,440. PATENTED SEPT. 10, 1907.
C. W. SLEEPER.
FLANGING MACHINE.
APPLICATION FILED NOV. 30, 1906.

6 SHEETS—SHEET 6.

Witnesses.
R. N. Flint
A. M. Parkins

Inventor.
Charles W. Sleeper
by A. P. Greeley
Atty.

THE NORRIS PETERS CO., WASHINGTON, D. C.

UNITED STATES PATENT OFFICE.

CHARLES W. SLEEPER, OF LANCASTER, NEW HAMPSHIRE.

FLANGING-MACHINE.

No. 865,440.  Specification of Letters Patent.  Patented Sept. 10, 1907.

Application filed November 30, 1906. Serial No. 345,829.

*To all whom it may concern:*

Be it known that I, CHARLES W. SLEEPER, a subject of the King of Great Britain and Ireland, residing at Lancaster, in the county of Coos, State of New Hampshire, have invented certain new and useful Improvements in Flanging-Machines, of which the following is a description, reference being had to the accompanying drawings, forming a part hereof.

My invention relates to flanging machines and particularly to that class of flanging machines which are adapted to form flanges upon can bodies by means of dies.

The invention has for its object to provide an organized machine adapted to form upon one end of the can body an inwardly turned flange suitable to receive and have soldered to it a "roll top" such as is commonly used in sardine cans, and to form on the other end an outwardly turned flange suitable to be folded in with a flange on the can bottom to form a double seam; to provide in such machine means by which the can body shall be held firmly during each of the operations necessary to complete the formation of the flanges and shall be released after each operation to permit it to pass to position for the succeeding position; to provide means by which the movement of the can body when released is guided and controlled to position it for the succeeding operation.

With these and other objects as hereinafter explained in view my invention consists in the constructions and combinations of elements hereinafter described and particularly pointed out in the claims.

Figure 1:
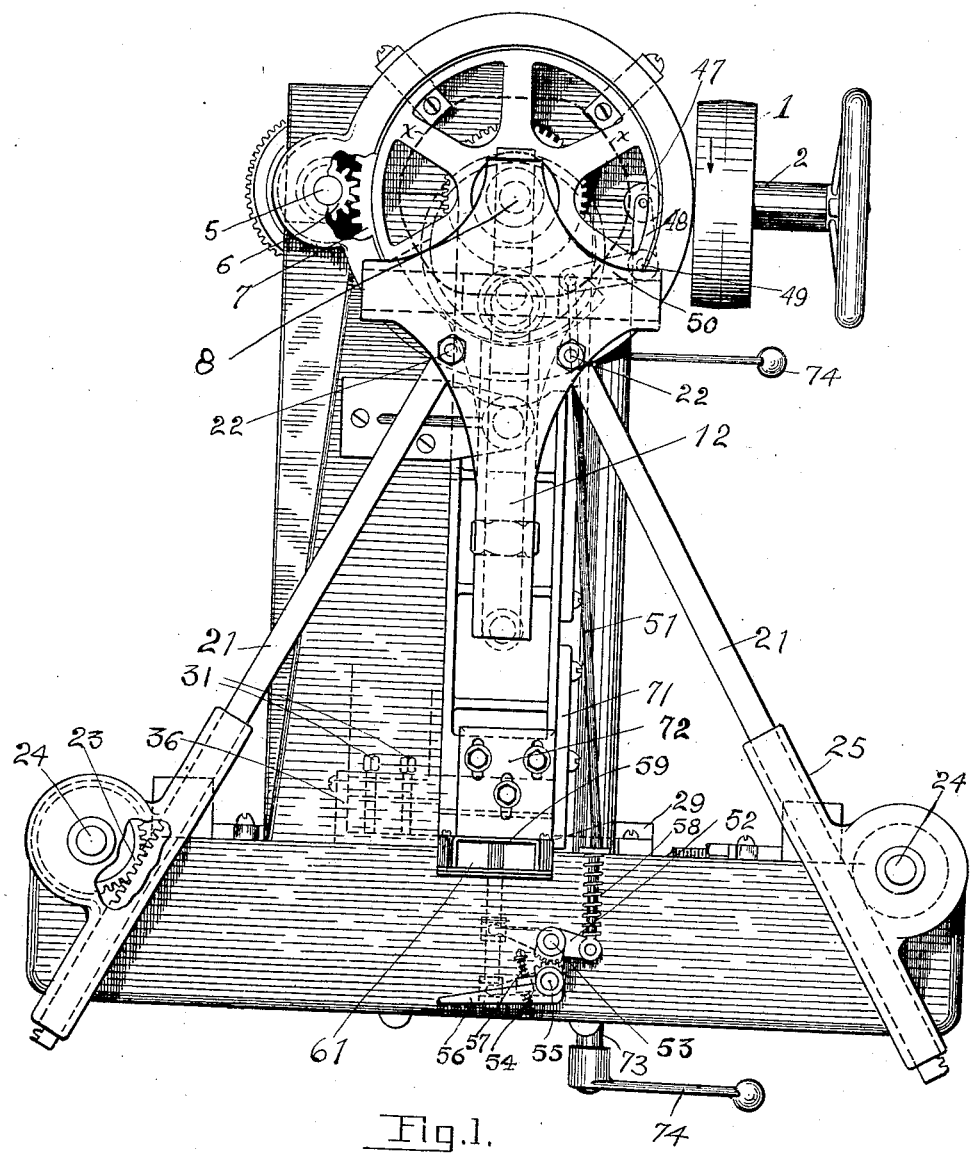
Figure 2:
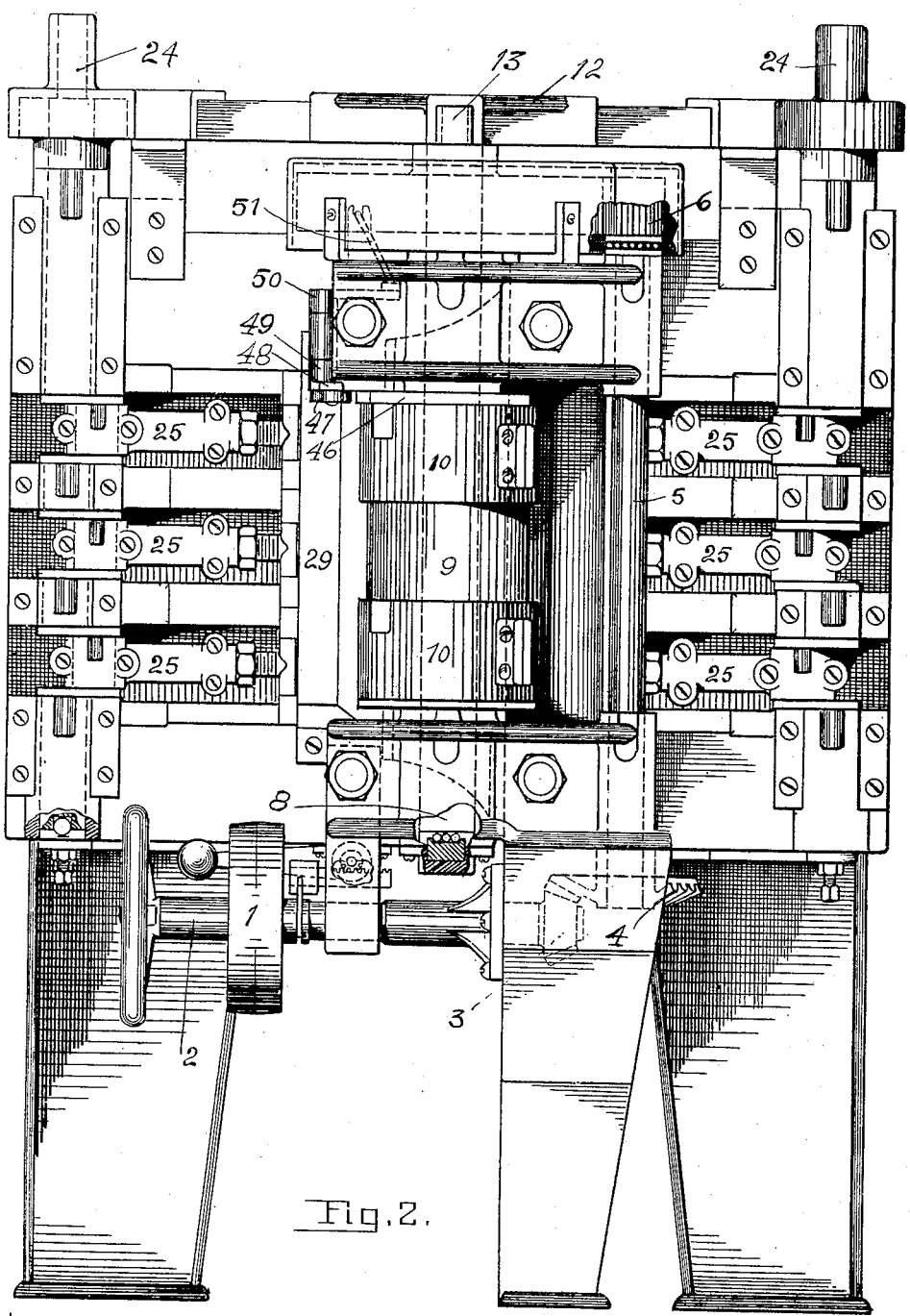
Figure 3:
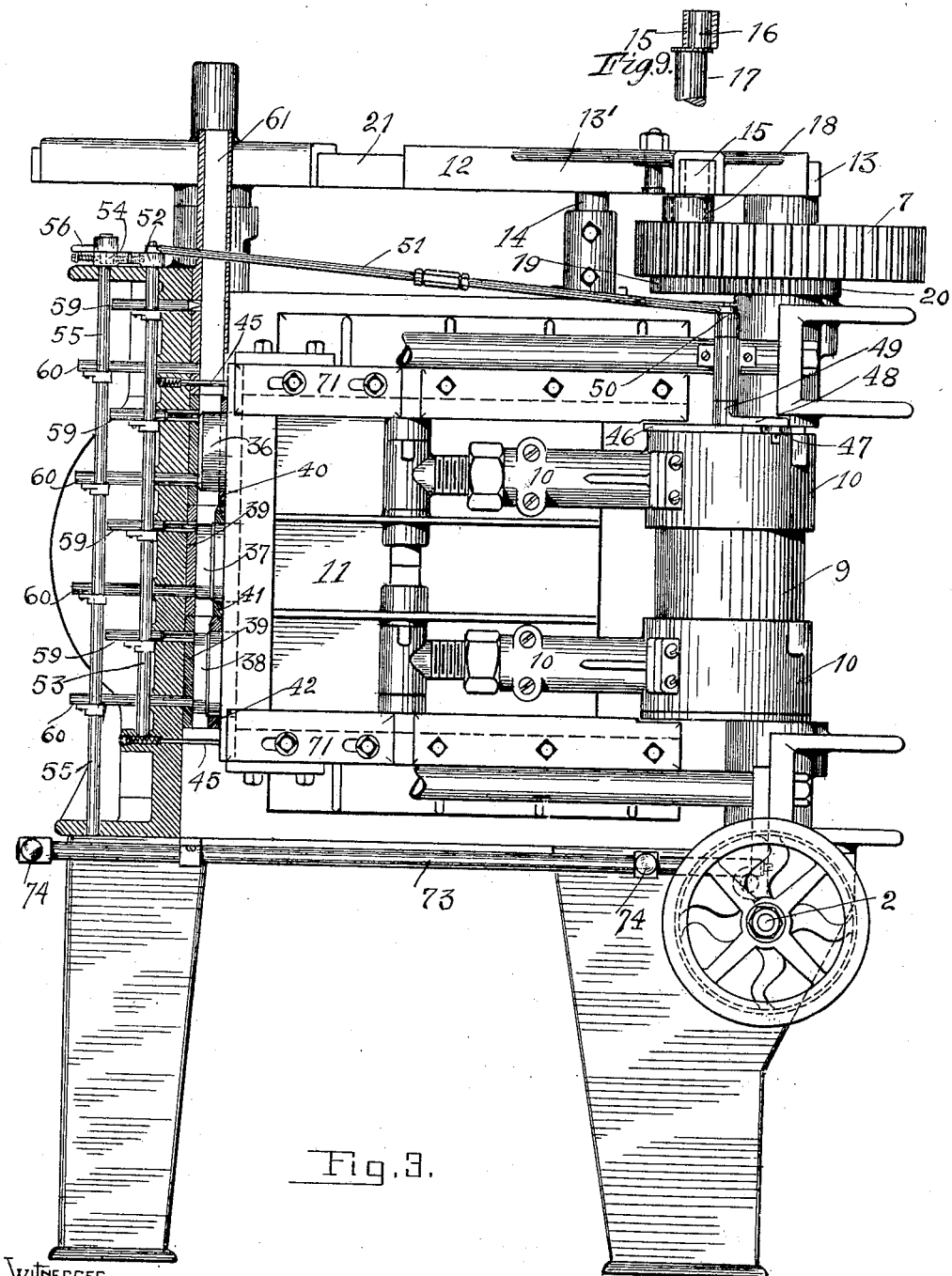
Figure 4:
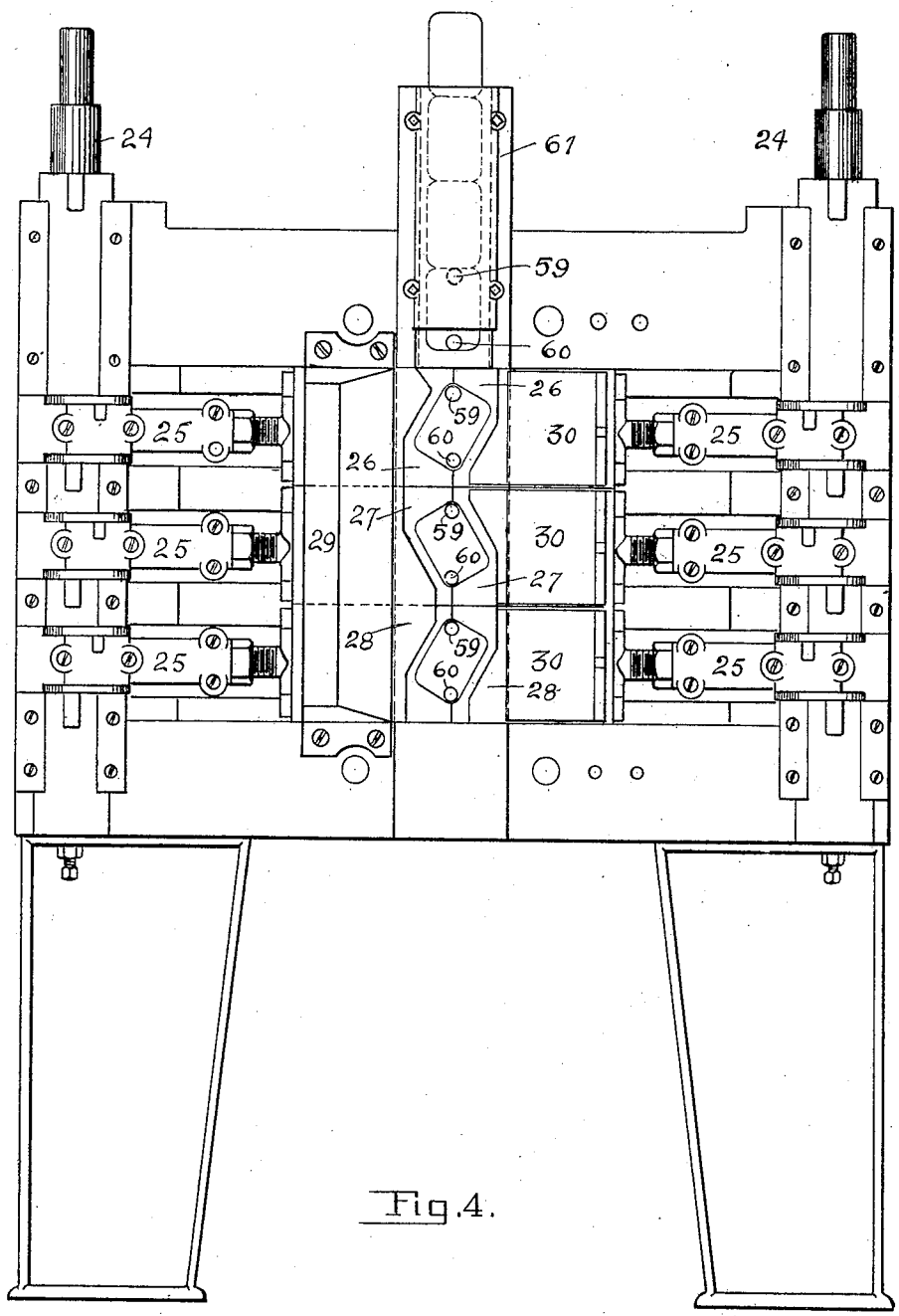
Figure 5:
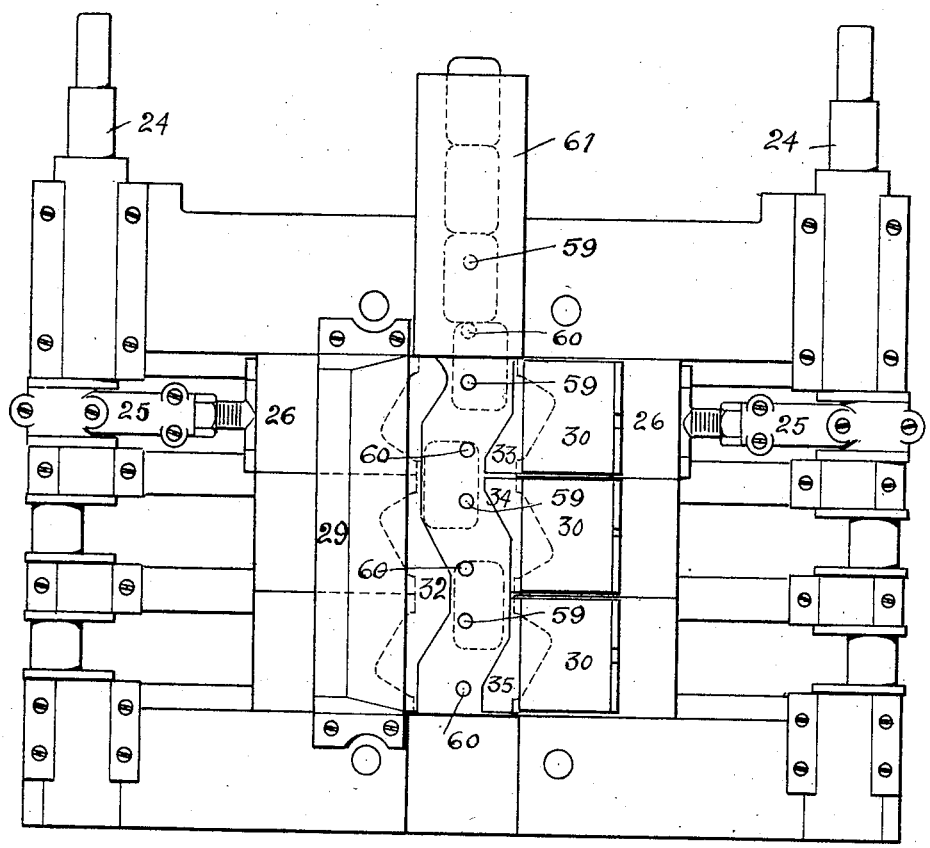
Figure 10:
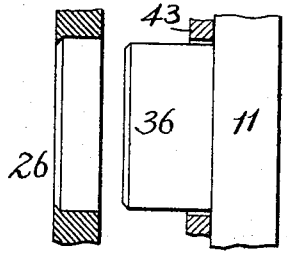
Figure 11:
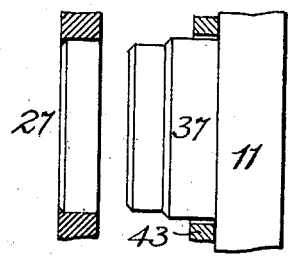
Figure 12:
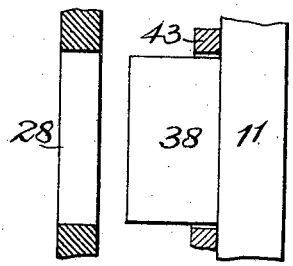
Figures 6, 8:
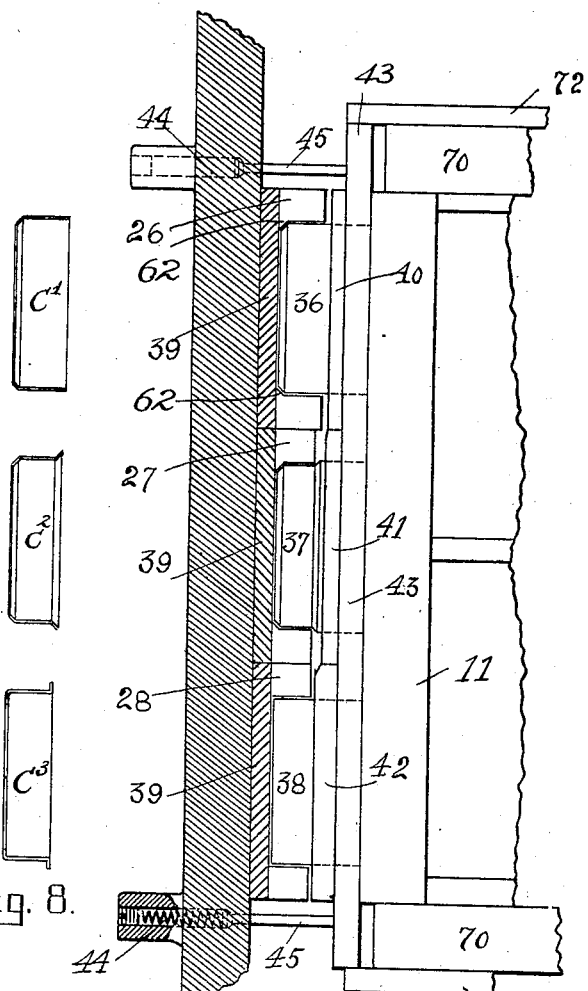
Figure 7:
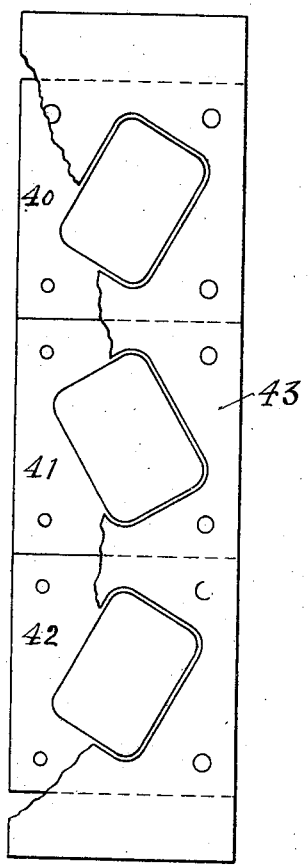

In the drawings,—Figure 1 is a top plan view with parts broken away to show mechanism. Fig. 2 is an end elevation from the front or driving mechanism end of the machine. Fig. 3 is a side view of the machine partly in section. Fig. 4 is a view in elevation of the side dies and their operating mechanism showing the side dies closed on the can bodies. Fig. 5 is a similar view showing the side dies withdrawn to permit the can bodies to be advanced to successive positions. Fig. 6 is an enlarged detail view partly in section showing the punches and dies. Fig. 7 is a detail view showing the strippers and stripper plate. Fig. 8 is a view showing the successive changes made in the can body by the several dies and punches. Fig. 9 is a detail view of the pin and connection for operating the cross head to which the racks for operating the side dies are connected. Figs. 10, 11 and 12 are enlarged detail views showing the several side dies and punches.

The machine is designed to operate upon previously formed can bodies which are fed into a suitable chute and are automatically advanced to successive positions in which they are operated upon by dies and punches to first turn inward the top edge of the body at an angle of about 45°, second, to turn outward the bottom edge of the body at an angle of about 45° and third to turn the flanges thus formed on top and bottom to an angle of 90°.

The machine is arranged to simultaneously operate upon three bodies, on one of which the first operation is being effected while the second operation is being effected on a body on which the first operation has previously been effected and the third operation is being effected on a body on which the first and second operations have previously been effected.

The several operations upon the three can bodies are effected by means of punches and dies simultaneously reciprocated in one direction to effect the flanging and withdrawn to permit the can bodies acted on to be shifted.

Referring to the drawings 1 indicates a pulley driven by any convenient power, on a horizontally arranged power shaft 2 to which it is preferably connected by means of a clutch of ordinary construction. On shaft 2 is a bevel gear 3 meshing with a bevel gear 4 on a vertical shaft 5 suitably journaled in the frame of the machine. On the upper end of the shaft 5 is a pinion 6 meshing with a gear 7 on a vertical shaft 8 which carries the cams and eccentrics by which the parts which operate upon the can bodies are actuated.

9 indicates an eccentric on shaft 8. 10, 10, indicate eccentric rods having straps surrounding the eccentric which is of such length as to receive and actuate the two eccentric rods. The eccentric rods are made adjustable and are connected at their forward ends to a cross head 11 which carries the punches as hereinafter described and is guided in its reciprocation by suitable grooves formed in the frame of the machine.

Above the cross head 11 is a slide 12 having the general form of a cross for operating the rack bars by which the mechanisms for reciprocating the side dies are actuated. This slide is formed with two grooves in its under face one in line with the line of movement of the cross head 11, and the other at right angles thereto. The longitudinal groove of the cross 12 fits upon and is guided on two blocks 13 and 13' one carried on the upper end of the cam shaft 8 and the other carried on a stud 14 on the frame of the machine in line with the line of movement of the cross head 11. The transverse groove of the cross is adapted to receive a block 15 carried by a crank pin 16 formed on a spindle 17 which is journaled in a box or lug 18 on the upper face of gear 7, the spindle extending through the gear and carrying a pinion 19 on its lower end. The pinion 19 meshes with a stationary gear 20 concentric with the shaft 8 but fixed to the frame of the machine.

As the gear 7 is rotated the block 15 will be carried around with it and will cause the cross 12 to reciprocate, the direction of its reciprocation being determined by the blocks 13 and 13' in the longitudinal groove. If the block 15 were carried directly by the spindle 17 the cross 12 would be continuously operated in one direction or the other without pause or dwell between its movements. It is for the purpose of securing pause or dwell that the crank pin 16 is provided for carrying the block 15. This crank pin is so formed on the spindle 17 that its eccentricity is one-sixteenth of the distance between the centers of spindle 17 and shaft 8. The ratio of gears 19 and 20 is as 1 to 2 and the parts are so arranged that when the spindle is in line with the line of movement of the cross head 11 the crank pin will be in the same line and at its nearest approach to shaft 8. As the gear 7 is rotated and the spindle 17 is carried away from this line the crank pin, by the action of the pinion 19 will be moved further away from the shaft 8 the result being that the crank pin 16 and block 15 will move approximately in a straight line at right angles to the line of movement of the cross head 11 until the crank pin is rotated to the point at which it is at its greatest distance from the shaft 8. As a result of this movement the crank pin 16 instead of moving in a circle about the center of shaft 8 will describe a path substantially that indicated by the dotted line $x-x$ on Fig. 1, and the cross or slide 12 will at the end of each longitudinal movement remain at rest during one-sixth of a rotation of the gear 7.

Pivoted to the cross or slide 12 by pins 22 are arms 21, 21, having their free ends provided with rack teeth and held by suitable guides in engagement respectively with gears 23, 23 on the upper ends of vertical crank shafts 24, 24, arranged at opposite sides of the machine. The crank shafts 24, 24, are each provided with three cranks each connected by an adjustable connecting rod with one of the side dies 26, 27 or 28. The rotation of the crank shafts 24 in one direction causes the dies of each pair of side dies to be brought together to clamp a can body between them and their rotation in the other direction causes the dies of each pair to be drawn apart. By reason of the movement of the crank pin 16 as above described the side dies will be held open during one-sixth of a rotation of the shaft 8 and will be held closed also during one-sixth of a rotation, the opening and closing taking place in the intervening portions of the rotation of the shaft.

The pairs of side dies 26, 27, and 28 are guided in their reciprocation between the back plate of the machine and suitable guide bars supported in the frame of the machine. The guide bar for the side dies shown at the left in Figs. 2, 4 and 5 consists of a bar 29 suitably secured at its ends to the frame of the machine while the side dies shown at the right in Figs. 4 and 5 are guided by angle bars 30 which are held in place by screws 31, as shown in dotted lines in Fig. 1.

To the face of bar 29 is secured a sheet metal guide 32 and to the angle bars 30 are secured sheet metal guides 33, 34 and 35, the guides 32, and 33, 34 and 35 forming between them a guide way by which the can bodies are guided in their passage from one set of side dies to another.

The side dies 26, 26, 27, 27, and 28, 28, are formed to fit the outside of the can body. The punches 36, 37 and 38 which are carried by the cross head 11 are formed to fit the inside of the can body. The respective movements of the side dies and the punches are so timed that the side dies are fully closed upon the outside of the can body at the instant the punches enter the can body between the pairs of side dies and remain closed until the punches complete their forward movement and start to withdraw from the can bodies. As the punches are withdrawn the side dies are separated with a more rapid movement than the movement of the punches and remain fully separated during the last part of the withdrawal movement of the dies and the beginning of the next forward movement.

The ends of the punches 36, 37 and 38 act against hardened steel bed plates 39, 39, 39, secured to the frame of the machine. For the purpose of stripping the can bodies, after they are acted on, from the punches, strippers 40, 41, and 42 are provided. These strippers fit the punches accurately and are carried by a stripper plate 43 which fits loosely over the punches and guided by the cross head guides 70, 71 and 72. The stripper plate is normally held against the end of guide 70 by four compression springs 44 through pins 45.

For the purpose of properly positioning the can bodies to be engaged by the side dies and the punches and to also permit the can bodies to be advanced from the chute to the first pair of dies and from the first pair of dies after it has been operated on to the second pair of dies and so on, pins 59 and 60 are provided extending through suitable openings in the bed plates 39, and the frame of the machine and adapted to be alternately so withdrawn and thrust forward as to permit the can bodies to drop, while the side dies are open just the right distance to bring them in proper position to be acted on. These pins 59 and 60 are operated by the shaft 8 through a cam 46 on the end of the cam 9. In the path of this cam is arranged a roller 47 carried by an arm 48 on a spindle 49 suitably journaled in the frame of the machine and having on its opposite end an arm 50 to which is connected one end of a rod 51 the other end of which is connected to an arm 52 on a vertical rod 53 journaled in the frame of the machine in rear of the side dies. The arm 52 is provided with gear teeth which engage similar teeth on an arm 54 which is loose upon a vertical rock shaft 55 journaled in the frame of the machine parallel with but in rear of the shaft 53. An arm 56, secured to the shaft 55 is held normally against arm 54 by compression springs and bolt 57 the bolt passing through suitable ears projecting from said arms. A spring 58 acting in one direction against the arm 52 and in the other direction against a fixed stop on the machine serves to hold the parts in the position in which they are shown in Fig. 1; that is with the pins 59 and 60 thrust forward. The pins 59 are engaged by arms on rock shaft 53 and the pins 60 are engaged by arms on rock shaft 55. As these shafts 53 and 55 are alternately rocked in one direction through the action of the cam 46 and in the other direction by the spring 58 the pins 59 and 60 alternately enter and recede from the channel down which the can bodies pass between the side dies, the pins 59 entering this channel as the pins 60 are withdrawn from it and vice versa. The movement of these pins 59 and 60 are so timed that the pins 59 are thrust forward into the channel before the punches 36, 37 and 38 enter the can bodies and as the punches strike these pins the pins yield against the force of the springs 57, returning as the punches are withdrawn.

61 is the feed chute in line with the channel between the side dies. The can bodies are placed in this chute and are permitted to be fed forward by gravity, by the pins 59 and 60. In this feeding operation the can body is caught by pin 59 and prevented from dropping. As pin 59 is withdrawn the can body drops but pin 60 having entered the channel as 59 is withdrawn it can drop only to the point at which it strikes pin 60; then as pin 60 is withdrawn and the second pin 59 is thrust forward the can body drops until caught by this second pin 59. When so caught and stopped the can body is in position to be engaged by the side dies 26, 26 as they close. As the punch 36 enters between the sides dies the pin 59 is pushed backward against the force of the spring 58. As the side dies and punch 36 are withdrawn the second pin 60 enters and the can body being no longer supported either by the pin 59 by the side dies or by the punch, drops and is caught by and hangs from pin 60. As the cross head 11 begins again to move rearward the pin 60 is withdrawn and the can body drops until it is caught by and hangs from the third pin 59 and is then in position to be engaged by the side dies 27, 27. In a similar manner the can body is dropped, after being acted on, from dies 27, 27 to position to be acted on by dies 28, 28, and dropped from dies 28 28, after being acted on, out of the machine. In thus dropping from point to point through the chute 61 and the channel between the side dies the can bodies are guided by the guides 32, 33, 34 and 35, these guides being preferably so formed that the can body as it enters between side dies 26, 26 will be pushed over to the right, (see Figs. 5 and 6) and will hang with its left-hand corner from the pin 59. After the can body has been acted on by dies 26, 26 and punch 36 and the dies and punch and pin 59 are withdrawn, the can body in dropping to pin 60 has its upper end shifted over to the left so that when pin 60 is withdrawn and the can body drops to the next pin 59 its right-hand upper corner will rest on this pin 59. And in dropping after being acted on by dies 27, 27 and punch 37, the position of the can body is again shifted so that between side dies 28, 28 the can body hangs in the same position in which it hangs between side dies 26, 26. By thus shifting the position of the can body the possible formation of a fin at the point at which the side dies come together is avoided and the can body is trued to shape better than would otherwise be the case.

In the operation of the machine a can body having been dropped to position between the dies 26, 26 and hanging from the pin 59, the dies close, clamping the can body firmly between them and the cross head 11 advances forcing the punch 36 into the can body thus clamped between the dies. As the cross head continues to advance it carries with it the stripper plate 43 which is brought against the edge of the can body forcing it into the dies and causing its opposite edge to press against the inwardly projecting shoulder 62 on the dies by which action such edge is turned inward at about an angle of 45° as shown at C' Fig. 8. As the cross head begins to withdraw the side dies are withdrawn and the can body is carried by the punch until the stripper plate 43 comes against the ends of guide 70 when it is stopped and holds the can body against further movement with the punch, the further movement of the cross head withdrawing the punch from the can body permitting it to drop and be caught by the pin 60. By the withdrawal of pin 60 and the advance of pin 59 the can body is dropped into position between dies 27—27, where it is held by the closing of these dies for the action of punch 37. Punch 37 has a shoulder 63 which strikes the edge of the can body turning it over at an angle of 45°, as shown at $C^2$ Fig. 8. The can body thus having formed on one edge an inwardly turned flange and on the other an outwardly turned flange is stripped from the punch as before and drops into position between the dies 28, 28. The punch 38 then acts upon it to flatten the inwardly turned flange against the bed plate 39 the stripper 42 acting against the outwardly turned flange to flatten the outwardly turned flange, thus bringing the can body to the shape shown at $C^3$ Fig. 8.

The power shaft 2 is provided with the usual clutch for starting and stopping the mechanism, the clutch being operated through shipper rod 73 with arms 74.

The machine is shown adapted for flanging the bodies for sardine cans of the ordinary square form but may readily be adapted for flanging can bodies of other shapes by changing the shapes of the side dies and the punches.

The machine may be arranged, if desired, to produce one of the flanges only, either the inturned or the outturned flange and it will of course be understood that the machine may be readily adapted to effecting other die shaping operations than the flanging of can bodies.

What I claim is,—

1. In a machine for forming flanges on can bodies, the combination of a pair of side dies adapted to fit the exterior of the can body, a punch adapted to enter the interior of the can body between the side dies, said dies and punch being arranged horizontally, a cam shaft, means operated by the cam shaft for reciprocating the side dies and for reciprocating the punch, and a channel extending between the side dies through which cans are fed by gravity, the means for reciprocating the side dies being adapted to hold the side dies closed during the operation of the punch.

2. In a machine for forming flanges on can bodies, the combination of a pair of side dies adapted to fit the exterior of the can body, a punch adapted to enter the interior of the can body between the side dies, said dies and punch being arranged horizontally, means for reciprocating the side dies and for reciprocating the punch, a channel extending between the side dies through which cans are fed by gravity, a chute leading to the channel between the side dies, and means for controlling the feeding of the can bodies to the side dies.

3. In a machine for forming flanges on can bodies, the combination of a pair of side dies adapted to fit the exterior of the can body, a punch adapted to enter the interior of the can body between the side dies, said dies and punch being arranged horizontally, means for reciprocating the side dies and for reciprocating the punch, a channel extending between the side dies through which cans are fed by gravity, a chute leading to the channel between the side dies, and means for controlling the feeding of the can bodies to the side dies adapted to position the can bodies between the side dies.

4. In a machine for forming flanges on can bodies, the combination of a pair of side dies adapted to fit the exterior of the can body, a punch adapted to enter the interior of the can body between the side dies, said dies and punch being arranged horizontally, a cam shaft, means operated by the cam shaft for reciprocating the side dies and for reciprocating the punch, a channel extending between the side dies through which cans are fed by gravity, a chute leading to the channel between the side dies, and means operated by the cam shaft for controlling the feeding of the can bodies to the side dies.

5. In a machine for forming flanges on can bodies, the combination of a pair of side dies adapted to fit the exterior of the can body, a punch adapted to enter the interior of the can body between the side dies, said dies and punch being arranged horizontally, a cam shaft, means operated by the cam shaft for reciprocating the side dies and for reciprocating the punches, a channel extending between the side dies through which cans are fed by gravity, a chute leading to the channel between the side dies, and means operated by the cam shaft for controlling the feeding of the can bodies to the side dies adapted to postion the can bodies between the side dies.

6. In a machine for forming flanges on can bodies, the combination of a vertically arranged series of pairs of side dies adapted to fit the exterior of a can body, a vertically arranged series of punches each coresponding to one of the pairs of side dies and adapted to enter the can body between the side dies, said dies and punches being arranged in horizontal planes, means for simultaneously reciprocating the side dies, and for reciprocating the punches, a channel extending between the side dies through which cans are fed by gravity, a chute leading to the channel between the side dies, and means for controlling the feeding of the can bodies to the side dies.

7. In a machine for forming flanges on can bodies, the combination of a vertically arranged series of pairs of side dies adapted to fit the exterior of a can body, a vertically arranged series of punches each corresponding to one of the pairs of side dies and adapted to enter the can body between the side dies, said dies and punches being arranged in horizontal planes, means for simultaneously reciprocating the side dies, and for reciprocating the punches, a channel extending between the side dies through which cans are fed by gravity, a chute leading to the channel between the side dies, and means for controlling the feeding of the can bodies to the side dies adapted to position the can bodies between the side dies.

8. In a machine for forming flanges on can bodies, the combination of a vertically arranged series of pairs of side dies adapted to fit a can body, a vertically arranged series of punches each corresponding to one of the pairs of side dies and adapted to enter the can body between the side dies, said dies and punches being arranged in horizontal planes, means for simultaneously reciprocating the side dies and for reciprocating the punches, and a channel extending between the side dies through which cans are fed by gravity, the means for reciprocating the side dies being arranged to hold the side dies in closed position while the punch is operating on the can body.

9. In a machine for forming flanges on can bodies, the combination of a vertically arranged series of pairs of side dies adapted to fit a can body, a vertically arranged series of punches each corresponding to one of the pairs of side dies and adapted to enter the can body between the side dies, said dies and punches being arranged in horizontal planes, means for simultaneously reciprocating the side dies and for reciprocating the punches, the means for reciprocating the side dies being arranged to hold the side dies in closed position while the punch is operating on the can body, means whereby cans are fed by gravity into positions to be operated upon by said punches, and means for controlling the feed of the can bodies to the successive pairs of side dies.

10. In a machine for flanging can bodies, a vertically arranged series of pairs of horizontally movable side dies, means for forcing the dies of each pair together to hold a can body and for separating them to permit the can bodies to descend by gravity from one pair of side dies to another, and means for controlling the movement of the can bodies from one pair of side dies to another.

11. In a machine for flanging can bodies, a vertically arranged series of pairs of horizontally movable side dies, means for forcing the dies of each pair together to hold a can body and for separating them to permit the can bodies to descend by gravity from one pair of side dies to another, and means for controlling the movement of the can bodies from one pair of side dies to another adapted to position the can bodies between the side dies.

12. In a machine for flanging can bodies comprising a vertically arranged series of pairs of side dies and means for forcing the dies of each pair together to hold a can body and for separating them to permit the can bodies to pass from one pair of dies to another, means for controlling the movement of the can bodies from one pair of dies to another consisting of pairs of pins adapted to enter the space between the side dies and means for withdrawing the pins of each pair alternately.

13. In a machine for flanging can bodies comprising a vertically arranged series of pairs of side dies and means for forcing the dies of each pair together to hold a can body and for separating them to permit the can bodies to pass from one pair of dies to another, means for controlling the movement of the can bodies from one pair of dies to another consisting of pairs of pins adapted to enter the space between the side dies and means for withdrawing the pins of each pair alternately, and side guides for guiding the can bodies in their passage from one pair of dies to another.

14. In a machine for flanging can bodies, a vertically arranged series of pairs of horizontally movable side dies, means for forcing the dies of each pair together to hold a can body and for separating them to permit the can bodies to descend by gravity from one pair of dies to another, and means for controlling the movement of the can bodies from one pair of side dies to another consisting of pairs of pins adapted to enter the space between the side dies and yielding means for thrusting the pins into and withdrawing them from said space.

15. In a machine for flanging can bodies comprising a vertically arranged series of pairs of side dies and means for forcing the dies of each pair together to hold a can body, and for separating them to permit the can bodies to pass from one pair of dies to another, means for controlling the movement of the can bodies from one pair of side dies to another consisting of pairs of pins adapted to enter the space between the side dies, and yielding means for thrusting the pins into and withdrawing them from said space, said means being arranged to withdraw the pins of each pair alternately.

16. In a machine for flanging can bodies, a vertically arranged series of pairs of horizontally movable side dies, means for forcing the dies of each pair together to hold a can body and for separating them to permit the can bodies to descend by gravity from one pair of dies to another, a vertically arranged series of punches adapted to enter the can bodies between the dies, and means for controlling the movement of the can bodies from one pair of side dies to another comprising pairs of pins adapted to enter the space between the side dies of each pair and means for withdrawing said pins and yielding means for thrusting said pins into said space, said dies and punches being arranged in horizontal planes.

17. In a machine for flanging can bodies, comprising a vertically arranged series of pairs of side dies and means for forcing the dies of each pair together to hold a can body and for separating them to permit the can bodies to pass from one pair of dies to another, and punches adapted to enter the can bodies between the dies, means for controlling the movement of the can bodies from one pair of side dies to another, comprising pairs of pins adapted to enter the space between the side dies of each pair, means for withdrawing said pins and yielding means for thrusting said pins into said space, said means for withdrawing the pins being arranged to withdraw the pins of each pair alternately.

18. In a machine for flanging can bodies comprising a pair of side dies and a punch adapted to enter between the side dies, a cam shaft and means actuated thereby for reciprocating the side dies and the punch, the means for reciprocating the side dies comprising a slide having a cross groove therein, a crank pin extending into said cross groove, carried by a spindle, a disk carried by the cam shaft in which the spindle is journaled, a pinion on the spindle and a stationary gear with which the pinion is in mesh, the parts being so arranged that as the spindle is revolved about the axis of the disk it is caused to rotate by the engagement of its pinion with the fixed gear.

19. In a machine for flanging can bodies comprising a pair of side dies and a punch adapted to enter between the side dies, means for reciprocating the punch, and means for reciprocating the side dies comprising a slide, means for guiding the slide and a spindle carried by a rotary disk having an eccentric pin engaging the slide to reciprocate it, the spindle being also provided with a pinion, and a fixed gear in mesh with the pinion, the parts being so arranged that as the spindle is revolved about the axis of the disk it will be rotated by the fixed pinion.

20. In a machine for flanging can bodies comprising a pair of side dies and a punch adapted to enter between the side dies, a cam shaft provided with an eccentric, connections between the eccentric and the punch for reciprocating it, a disk carried by the cam shaft having a spindle mounted to rotate therein, provided with a pinion, a fixed gear engaging the pinion, an eccentric pin carried by the spindle, and a slide operatively connected with the side dies, and arranged to be reciprocated by the eccentric pin.

This specification signed and witnessed this 24th day of November, A. D. 1906.

CHARLES W. SLEEPER.

In the presence of—
GEO. N. KENT,
BERNICE A. LYMAN.